United States Patent [19]

Schuurman

[11] 4,410,002

[45] Oct. 18, 1983

[54] VALVE PROVIDED WITH A THERMALLY-ACTUATED MECHANISM FOR PRESSING VALVE SEATS AGAINST A VALVE GATE BODY

[75] Inventor: Pieter J. Schuurman, The Hague, Netherlands

[73] Assignee: Shell Oil Company, Houston, Tex.

[21] Appl. No.: 474,857

[22] Filed: Mar. 14, 1983

Related U.S. Application Data

[62] Division of Ser. No. 260,508, May 4, 1981.

[30] Foreign Application Priority Data

Oct. 10, 1980 [GB] United Kingdom ................. 8032758

[51] Int. Cl.³ .......................... F16K 3/16; F16K 49/00
[52] U.S. Cl. ................................... 137/238; 137/340; 251/159; 251/195
[58] Field of Search ................ 137/238, 340; 251/159, 251/170, 195, 327

[56] References Cited

U.S. PATENT DOCUMENTS

| | | | |
|---|---|---|---|
| 2,132,262 | 10/1938 | Gabriel | 137/340 |
| 2,253,888 | 8/1941 | Carlson | 137/238 |
| 2,705,016 | 3/1955 | Saar | 137/340 X |
| 3,211,169 | 10/1965 | Webb | 137/340 |
| 4,292,992 | 10/1981 | Bhide | 137/340 |

FOREIGN PATENT DOCUMENTS

| | | | |
|---|---|---|---|
| 146097 | 6/1936 | Austria | 251/159 |
| 883659 | 12/1961 | United Kingdom | 251/159 |

*Primary Examiner*—Gerald A. Michalsky

[57] ABSTRACT

A valve for controlling the flow of fluids containing abrasive particles including thermally-actuated means for ensuring a tight seal between the movable valve element and the valve body in both the open and closed positions. The thermally-actuated means is deactivated when repositioning the movable valve element and reactivated to provide a tight seal when the movable valve element is in position.

3 Claims, 3 Drawing Figures

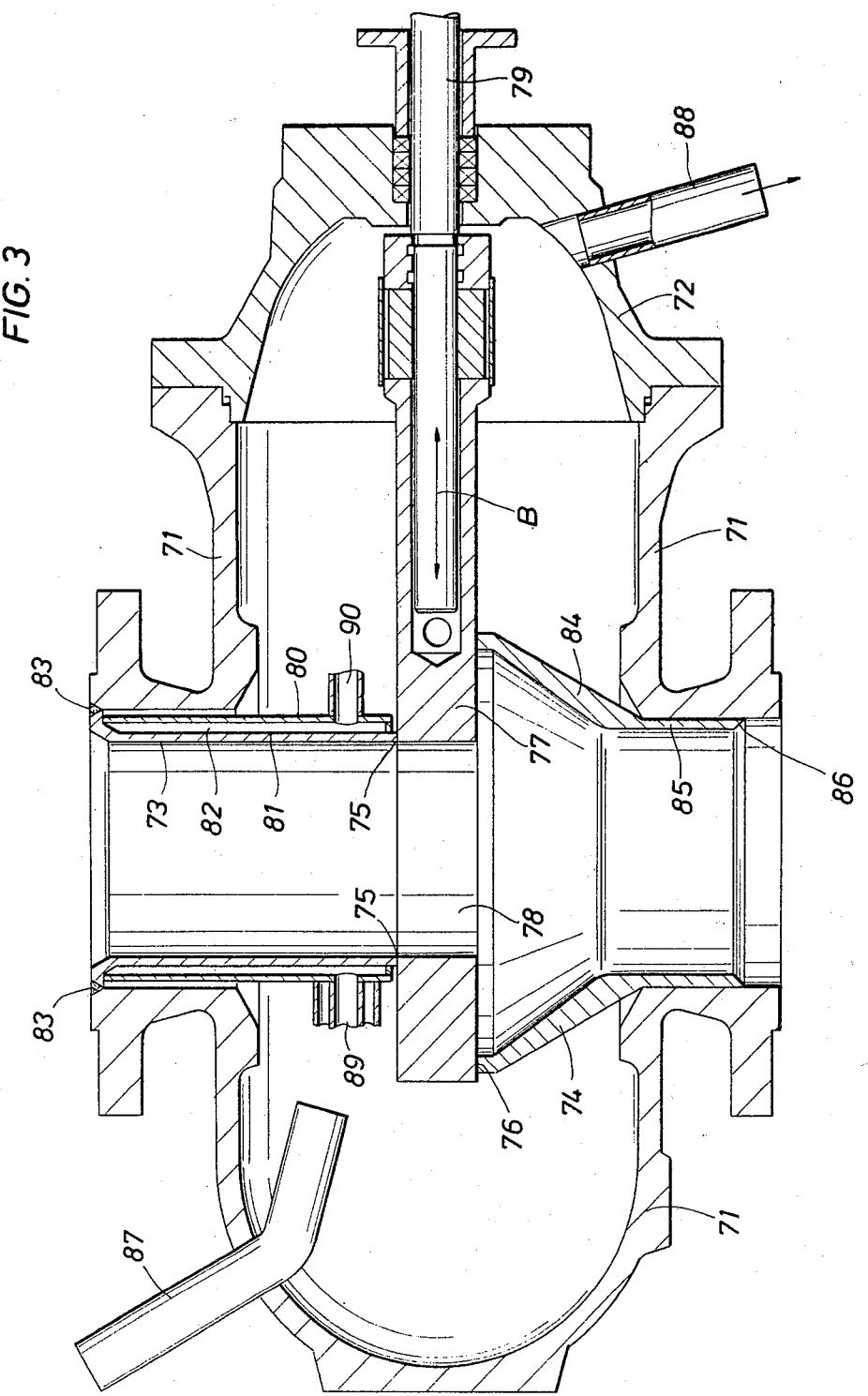

VALVE PROVIDED WITH A THERMALLY-ACTUATED MECHANISM FOR PRESSING VALVE SEATS AGAINST A VALVE GATE BODY

This is a division of application Ser. No. 260,508, filed May 4, 1981.

The invention relates to a valve provided with a mechanism for pressing the valve seats against the valve body or gate, in particular for fluids containing solid particles such as coal, ash or slag particles.

It is an object of the invention to provide a valve of the above kind having a relatively simple mechanism for creating a relatively high contact force between the valve seats and the valve gate body in order to obtain a fluid-tight sealing between the valve seats and the valve gate body and also for reducing the said contact force to zero, when it is necessary to displace the valve gate body, for example, from the open to the closed position and vice versa.

For this purpose, the valve according to the invention comprises a valve housing, a fluid supply and a fluid discharge, a valve gate body, a valve seat on the fluid supply and a valve seat on the fluid discharge, actuating means for displacing the valve gate body between open and closed positions, and a temperature sensitive device which is so constructed and arranged that by varying its temperature, the contact force between the valve seats and the valve gate body can be controlled at will.

The temperature sensitive device is preferably so constructed and arranged that when the temperature sensitive device is at a first predetermined temperature the said contact force is high and when the temperature sensitive device is at a second predetermined temperature the said contact force is zero. In a first embodiment of the valve according to the invention, the arrangement is such that the first predetermined temperature is a low temperature and the second predetermined temperature is a high temperature. In a second embodiment of the valve according to the invention, the arrangement is such that the first predetermined temperature is a high temperature and the second predetermined temperature is a low temperature.

In order to be able to displace the valve gate body with a minimum of friction and wear, it is desirable to have a certain amount of play between the valve body and the valve seats during the displacement of the valve gate body. For this purpose, the temperature sensitive device is preferably so constructed and arranged that when said contact force is zero a predetermined amount of play is present between the valve body and the valve seats.

The present invention is particularly useful in conjunction with a coal gasifying system, such as the system described in U.S. Pat. No. 3,994,702, in which a solids-containing fluid (such as an aqueous liquid or gas containing solid particles of coal, coal ash or slag) is discharged from a coal gasifier (or a slag bath unit associated with a coal gasifier). Such gasifiers are preferably operated at relatively high pressures which should be maintained during a discharge of such a fluid. The disclosure of U.S. Pat. No. 3,994,702 is incorporated herein by cross-reference.

In substance, the present invention comprises a valve which has a housing that contains a fluid supply conduit and a fluid discharge conduit for conveying fluid through the valve. A valve gate body is movably mounted within the housing for positioning an opening relative to the fluid supply and fluid discharge conduits to complete or block a fluid passageway between those conduits. Contact-resistant valve seat materials are arranged on the supply and discharge conduits and valve gate body for being pressed together to form substantially fluid-tight seals between the conduits and the valve gate body. At least one heat-expandable metal structure is positioned and arranged so that its thermally induced expansion or contraction relieves or applies a forceful compression of the supply and discharge conduits against the valve seat body. And, means are provided for heating or cooling said heat-expandable metal structure and for re-positioning the valve gate body when the force compressing it between the conduits is relieved.

The invention will be explained with reference to the drawings, wherein:

FIG. 3 shows a vertical section of a second embodiment of the valve according to the invention.

Figure 1:
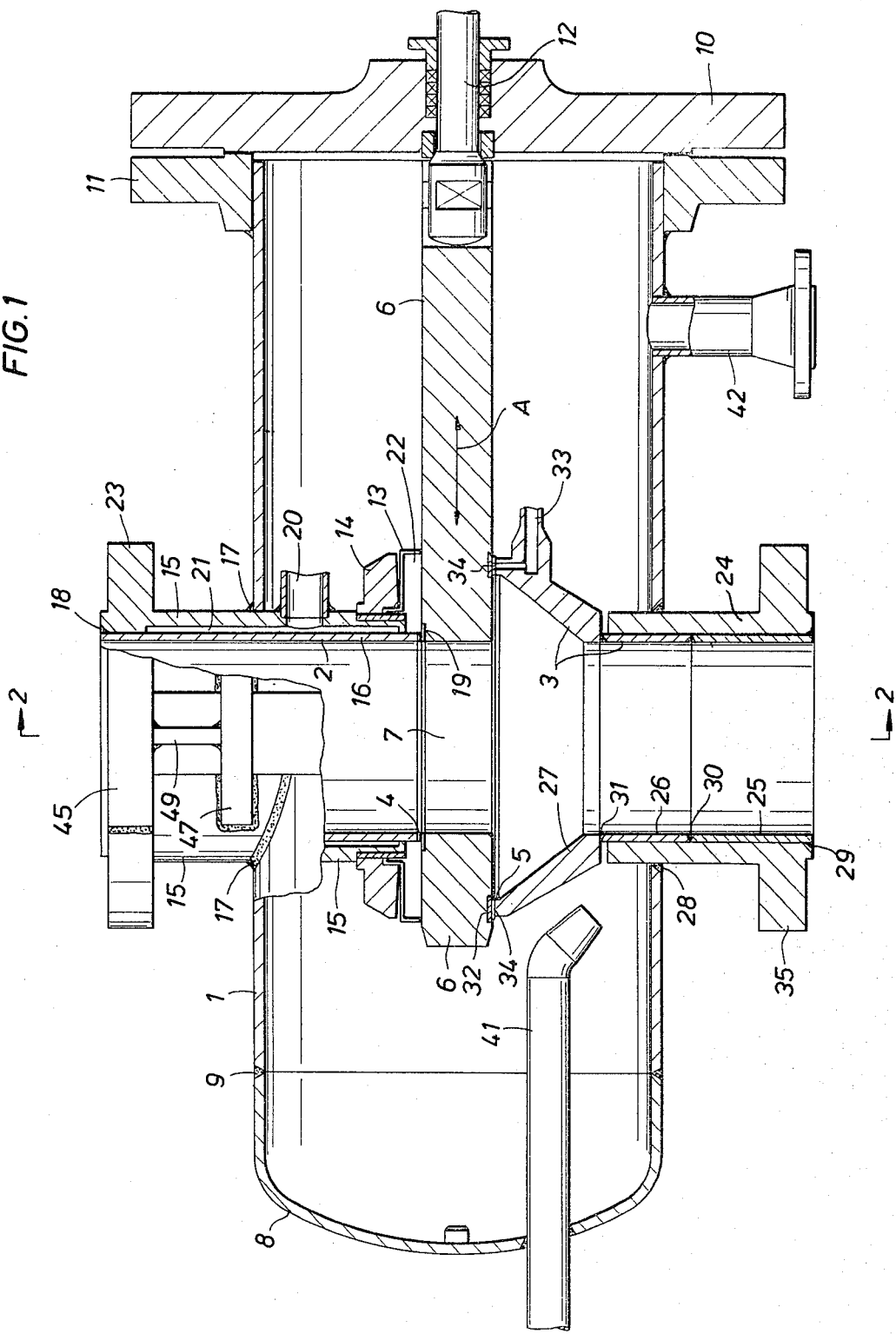
FIG. 1 shows a vertical section of a first embodiment of the valve according to the invention.
Figure 2:
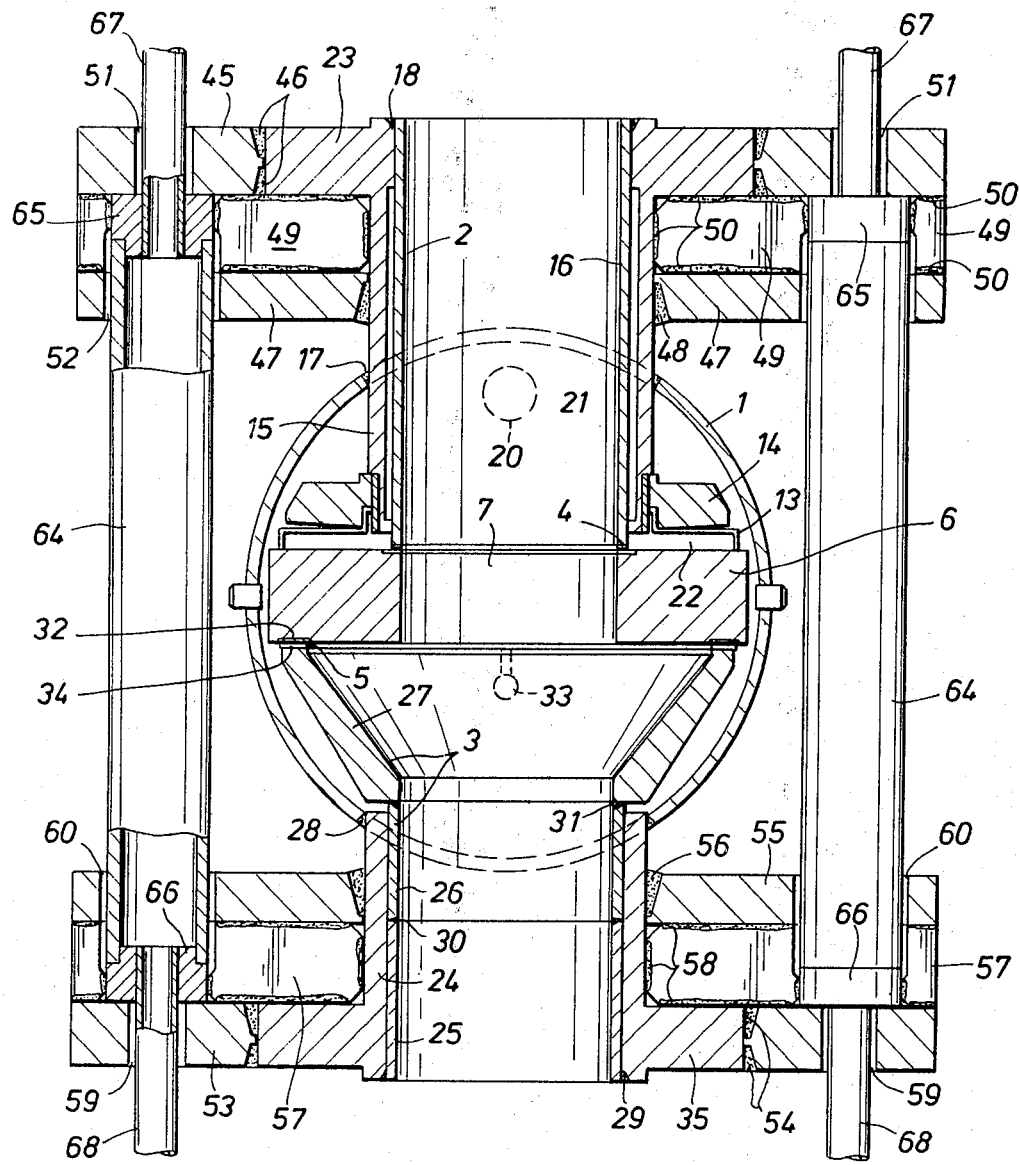
FIG. 2 shows a section II—II of the valve according to FIG. 1.

The valve according to FIGS. 1 and 2 comprises a valve housing 1 closed at one end by a cap 8, welded to the housing 1 by means of a weld 9 and closed at the other end by means of a plate 10. The plate 10 is secured in a fluid-tight manner to a flange 11 by means of bolts (not shown).

The housing 1 is provided with a fluid supply conduit 2 having a valve seat 4 and with a fluid discharge conduit 3 having a valve seat 5. The valve seats 4 and 5 are suitably provided with an overlay weld of an abrasion resistant material, for example, stellite.

The valve seats 4 and 5 co-operate with a valve gate body 6, provided with an opening or fluid passage 7. The valve gate body 6 is basically a flat plate provided at one end with a shaft 12 passing in a fluid-tight manner through a bore in the plate 10. The shaft 12 serves for displacing the valve gate body 6 linearly in the directions indicated by the arrow A.

The fluid supply conduit 2 comprises an outer tubular element 15 provided with a coaxial inner tubular element 16. The outer tubular element 15 is welded to the wall of the housing 1 by means of a weld 17. At one end the inner tubular element 16 is secured to the outer tubular element 15 by means of a weld 18. The valve seat 4 is located at the other end of the inner tubular element 16.

Around the fluid passage 7 in the valve gate body 6, a thin overlay weld 19 of abrasion-resistant material, for example, stellite, is arranged in such a manner that in the open position of the valve, the valve seat 4 and the overlay weld 19 contact each other. (Stellite is a metal alloy comprising W, Cr, Co and C).

The outer tubular element 15 is provided with an inlet 20 for flushing fluid. The inlet 20 is connected to a conduit for supplying a suitable flushing fluid, for example water or steam, from outside the valve housing 1 to the inlet 20. From the inlet 20 the flushing fluid can flow through an annular space 21 between the tubular elements 15 and 16 to an annular space 22 adjacent to the valve seat 4. Said space 22 is enclosed by an elastic sealing device 13, for example made of steel, part of the valve gate body 6 and part of the tubular elements 15 and 16. A stopper 14 secured to the tubular element 15 serves to limit the displacement of the elastic sealing device 13. Furthermore, the outer tubular element 15 is provided with a flange 23.

The fluid discharge conduit 3 comprises an outer tubular element 24 carrying coaxial inner tubular elements 25 and 26 and a hollow frusto-conical element 27. The outer tubular element 24 is welded to the wall of the housing 1 by means of a weld 28. The inner tubular element 25 is welded at one end to the outer tubular element 24 by means of a weld 29. The other end of the tubular element 25 is welded to one end of the inner tubular element 26 by means of a weld 30. The other end of the inner tubular element 26 is welded to an end of the frusto-conical element 27 by means of a weld 31. The valve seat 5 is located at the other end of the frusto-conical element 27.

Around the fluid passage 7 in the valve gate body 6, a thin overlay weld 32 of abrasion-resistant material, for example stellite, is arranged in such a manner that in the open position of the valve, the valve seat 5 and the overlay weld 32 contact each other.

The frusto-conical element 27 is provided with an inlet 33 for flushing fluid. The inlet 33 is connected to a conduit (not shown) for supplying a suitable flushing fluid, for example water or steam, from outside the valve housing 1 to the inlet 33. The inlet 33 communicates with an annular space 34 in the valve seat 5. The outer tubular element 24 is provided with a flange 35.

The housing 1 is provided with a flushing water inlet 41 and a flushing water drain 42 for removing settled solid articles from the housing 1, if necessary by means of water or another suitable flushing liquid.

The upper flange is provided with radial extensions 45, welded to the flange 23 by means of welds 46.

Further radial extensions 47 are secured to the tubular element 15 by means of welds 48. Radial webs 49 are arranged between the radial extensions 45, 47 and the flange 23 and welded thereto and to the tubular element 15 by means of welds 50. The radial extensions 45 are provided with bores 51 and the radial extensions 47 are provided with bores 52.

The lower flange 35 is provided with radial extensions 53, welded to the flange 35 by means of welds 54.

Further radial extensions 55 are secured to the tubular element 24 by means of welds 56. Radial webs 57 are arranged between the radial extensions 53, 55 and the flange 35 and welded thereto and to the tubular element 24 by means of welds 58. The radial extensions 53 are provided with bores 59 and the radial extensions 55 are provided with bores 60.

In the embodiment of the invention as shown in FIGS. 1 and 2, the temperature sensitive devices are formed by a pair of heat expandable metal pipes 64 passing through the bores 52 and 60. To each end of each pipe 64 an annular plug 65, respectively 66, is welded. The plugs 65 are welded to the radial webs 49 and to the radial extensions 45, whereas the plugs 66 are welded to the radial webs 57 and to the radial extensions 53. Supply conduits 67 for the supply of a heating or cooling fluid to the pipes 64 are welded to the plugs 65, whereas discharge conduits 68 for the discharge of said heating or cooling fluid are welded to the plugs 66.

The operation of the valve shown in FIGS. 1 and 2 is as follows. In the open position of the valve with the valve gate positioned as shown, a fluid carrying solid particles, for example water carrying slag particles or a gas carrying coal particles, enters the valve and passes through the fluid supply conduit 2, through the opening 7 in the valve gate body 6 and through the fluid discharge conduit 3, whereafter it leaves the valve.

The valve is so constructed that in this position of the valve gate body 6, a high contact force is present between the valve seats 4 and 5 and the valve gate body 6, or more in particular between the valve seats 4 and 5 and respectively the overlay welds 19 and 32 in the valve gate body 6. Because of the said high contact force an excellent fluid-tight sealing is obtained between the valve seats 4 and 5 and the valve gate body 6.

When it is desired to close the valve, the temperature of the metal pipes 64, is raised. This is done by passing a heating fluid, for example hot water or steam, through the pipes 64. The pipes 64 are made of a metal having a suitable coefficient of thermal expansion, so that sufficient heating of the pipes 64 causes such an increase in length of the pipes 64, that the contact force between the valve seats 4 and 5 and the valve body 6 is reduced to zero and preferably a certain amount of play is created between the valve seats 4 and 5 and the valve gate body 6.

After having heated the pipes 64 to the desired temperature, the valve gate body 6 is displaced to the left in the direction as indicated by the arrow A by means of suitable actuating means until the communication between the fluid supply conduit 2 and the fluid discharge conduit 3 is closed by the valve gate body 6. In that position of the valve gate body 6, the heating of the pipes 64 is stopped and the pipes 64 are either allowed to cool down to ambient temperature or the pipes 64 are cooled by passing a suitable cooling fluid, for example water, through the pipes 64, so that the pipes 64 contract again to their original length. The cooling of the pipes 64 in the above manner has the result that the seats 4 and 5 are brought again in contact with the valve gate body 6 and that the original high contact force, together with the fluid-tight sealing, between the seats 4 and 5 and the valve gate body 6 is restored.

When it is desired to open the valve again the pipes 64 are heated again in the same manner as described in the above, so that the contact force between the seats 4 and 5 and the valve gate body 6 is reduced to zero again and preferably a certain amount of play is created between the valve seats 4 and 5 and the valve gate body 6. Then the valve gate body 6 is replaced to its original position as shown in FIGS. 1 and 2. Finally, the pipes 64 are cooled again in the same manner as described in the above, so that the valve seats 4 and 5 are brought again in contact with the valve gate body 6 and that the original high contact force, together with the fluid-tight sealing, between the valve seats 4 and 5 and the valve gate body 6 is restored.

Of course the pipes 64 need not be heated by means of a heating fluid. Instead it is for example possible to heat the pipes 64 electrically.

If desired, solid particles can be removed from the valve seats 4 or 5 by supplying a suitable flushing fluid to the inlet 20, and, respectively, to the inlet 33.

The second embodiment of the valve according to the invention, as shown in FIG. 3, comprises a housing 71 closed by a cap 72. The housing 71 is provided with a fluid supply conduit 73 and a fluid discharge conduit 74. The fluid supply conduit 73 is provided with a valve seat 75 and the fluid discharge conduit 74 is provided with a valve seat 76.

The valve seats 75 and 76 cooperate with a valve gate body 77, provided with a fluid passage 78. The valve gate body 77 is basically a flat plate provided at one end with a shaft 79 passing in a fluid-tight manner through a bore in the cap 72. The shaft 79 serves for actuating the valve gate body 77, viz. for displacing the valve gate body 77 linearly in the direction as indicated by the arrow B.

The fluid supply conduit 73 comprises an outer tubular element 80 provided with a coaxial inner tubular element 81. The outer and inner tubular elements 80 and 81 are interconnected in a fluid-tight manner so that a fluid-tight annular chamber 82 is formed. The fluid supply 73 is secured to the housing 71 by means of a weld 83.

The fluid discharge conduit 74 comprises a hollow frustoconical part 84 and a tubular part 85. The end of the tubular part 85 is secured to the housing 71 by means of a weld 86.

The housing 71 is provided with a flushing water inlet 87 and a flushing water drain 88 for removing settled solid particles from the housing 71, if necessary, by means of water or another suitable flushing fluid.

The annular chamber 82 is provided with an inlet 89 for supplying heating or cooling fluid and with an outlet 90 for discharging heating or cooling fluid. The inlet 89 is connected to a conduit (not shown) for supplying a suitable heating or cooling fluid, such as for example steam or water, from outside the valve housing 71 to the inlet 89. The outlet 90 is connected to a conduit (not shown) for discharging heating or cooling fluid from the outlet 90 to outside the valve housing 71.

The fluid supply conduit 73 is made of a suitable heat-expandable metal. When heating fluid, for example water or steam, is supplied via the inlet 89 to the chamber 82, the temperature of the tubular elements 80 and 81 will be raised to such a degree that the increase in length of the elements 80 and 81 will cause the seat 75 to be pressed against the valve gate body 77, so that a relatively high contact force is created between the valve seat 75 and the valve gate body 77 and also between the valve seat 76 and the valve gate body 77. In this manner an effective fluid-tight sealing is created between the valve seats 75 and 76 and the valve body 77.

When it is desired to close the valve, a cooling fluid is supplied via the inlet 89 to the chamber 82, so that the tubular elements 80 and 81 are cooled down. This causes a contraction of the tubular elements 80 and 81, so that the contact force between the seats 75 and 76 and the valve gate body 77 is reduced to zero. Preferably, the tubular elements 80 and 81 are cooled down to such a degree that a certain amount of play is created between the valve seats 75 and 76 and the valve gate body 77.

Then the valve gate body 77 is displaced to the left in the direction as shown by the arrow B by means of suitable actuating means, until the communication between the fluid supply conduit 73 and the fluid discharge conduit 74 is closed. In that position of the valve gate body 77, the supply of cooling fluid to the chamber 82 is replaced by the supply of heating fluid. The heating fluid causes again expansion of the tubular elements 80 and 81, so that the valve seats 75 and 76 are brought again in contact with the valve gate body 77, and the high contact force, together with the fluid-tight sealing, between the valve seats 75 and 76 and the valve gate body 77 is restored.

When it is desired to open the valve again, cooling fluid is supplied to the chamber 82, so that the contact force between the valve seats 75 and 76 and the valve gate body 77 is reduced to zero and preferably a certain amount of play is formed between the valve seats 75 and 76 and the valve gate body 77. Then the valve gate body 77 is replaced to its original position as shown in FIG. 3 and finally the supply of cooling fluid to the annular chamber 82 is replaced by a supply of heating fluid. The supply of heating fluid to the annular chamber 82 causes the tubular elements 80 and 81 to expand so that the valve seats 75 and 76 are pressed again against the valve gate body 77 with a relatively high contact force.

In the embodiments of the invention as described in the above, the valve gate body is so arranged that it can be linearly displaced from an open to a closed position and vice versa. Instead it is, however, possible as well to apply the invention to a valve having a valve gate body which is so arranged that it can be rotated from an open to a closed position and vice versa.

What is claimed is:

1. A valve comprising:
    a valve housing containing a fluid supply conduit and a fluid discharge conduit for conveying fluid which flows through the valve;
    within the valve housing, a valve gate body which contains an opening and is movable relative to the fluid supply and discharge conduits to open or close the fluid passageway for said flow through the valve;
    contact resistant valve seat materials arranged on surfaces of the supply and discharge conduit and valve gate body for being pressed together to form substantially fluid-tight seals between those conduits and the gate valve body;
    at least one heat-expandable metal structure arranged so that its thermally-induced expansion and contraction relieves and applies a relatively high force for compressing the valve seat materials on the fluid supply and discharge conduits against those on the valve gate body, said heat expandable metal structure including the fluid supply conduit and having an annular fluid passageway disposed around said fluid supply conduit, means for circulating a fluid through said annular passageway for heating and cooling said expandable metal structure to cause said metal structure to expand and contract axially; and
    means for repositioning the valve gate body when the force compressing it between the fluid supply and discharge conduits is relieved.

2. The valve of claim 1 in which the valve gate body is axially movable relative to the fluid supply and fluid discharge conduits to open or close the passageway between the conduits.

3. The valve of claim 1 in which inlet and outlet conduits are arranged for conveying a flow of flushing fluid into and out of contact with the valve seat materials.

* * * * *